United States Patent
Pan et al.

(10) Patent No.: US 7,606,550 B2
(45) Date of Patent: Oct. 20, 2009

(54) METHOD AND SYSTEM FOR A DUAL MODE RECEIVER WITH LOW INTERMEDIATE FREQUENCY (IF) AND ZERO SECOND IF

(75) Inventors: Meng-An Pan, Irvine, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 189 days.

(21) Appl. No.: 10/976,639

(22) Filed: Oct. 29, 2004

(65) Prior Publication Data

US 2006/0094390 A1    May 4, 2006

(51) Int. Cl.
*H04B 1/26* (2006.01)

(52) U.S. Cl. .................. 455/326; 455/240.1; 455/260; 455/315

(58) Field of Classification Search .................. 455/230, 455/232.1, 234.1, 240, 250, 324, 323–326, 455/313–315, 334–341, 240.1, 250.1, 255–266
See application file for complete search history.

(56) References Cited

U.S. PATENT DOCUMENTS

| | | | | |
|---|---|---|---|---|
| 6,040,738 A * | 3/2000 | Uchida | ...................... | 329/302 |
| 6,442,380 B1 * | 8/2002 | Mohindra | ................. | 455/234.1 |
| 7,120,412 B2 * | 10/2006 | Anand | ........................ | 455/260 |
| 7,236,763 B2 * | 6/2007 | Heck | ........................... | 455/323 |
| 2002/0042255 A1 * | 4/2002 | Prentice | ................... | 455/232.1 |
| 2002/0136329 A1 * | 9/2002 | Liu et al. | ..................... | 375/326 |
| 2002/0150174 A1 * | 10/2002 | Spiegel et al. | ............... | 375/316 |
| 2003/0171101 A1 * | 9/2003 | Suzuki et al. | ............... | 455/147 |
| 2004/0014450 A1 * | 1/2004 | Yamamoto et al. | .......... | 455/307 |
| 2004/0102172 A1 * | 5/2004 | Hendin | ........................ | 455/302 |
| 2004/0152437 A1 * | 8/2004 | Behzad | ........................ | 455/326 |
| 2004/0161030 A1 * | 8/2004 | Mohindra et al. | ........... | 375/235 |
| 2004/0264608 A1 * | 12/2004 | Habuka et al. | .............. | 375/345 |
| 2005/0070325 A1 * | 3/2005 | Bellaouar et al. | ......... | 455/550.1 |
| 2006/0072685 A1 * | 4/2006 | Gong et al. | ................. | 375/316 |

\* cited by examiner

*Primary Examiner*—Nhan T Le
(74) *Attorney, Agent, or Firm*—McAndrews Held & Malloy, Ltd.

(57) ABSTRACT

In RF transceivers, a method and system for a dual mode receiver with low intermediate frequency (IF) and zero second IF are provided. An RF receivers may be adapted to operate in a low IF down conversion mode or a baseband down conversion mode. A control signal may be generated based on a local oscillator signal and may be utilized to configure a frequency mixer in accordance with the selected mode of operation. The frequency of the local oscillator may be based on the low IF value. When the low IF down conversion mode is selected, the frequency mixer operates in a pass through mode and the output may be transferred to a device with a low IF interface. When the baseband down conversion mode is selected, the output of the frequency mixer may be transferred to a baseband processor for further processing.

36 Claims, 5 Drawing Sheets

METHOD AND SYSTEM FOR A DUAL MODE RECEIVER WITH LOW INTERMEDIATE FREQUENCY (IF) AND ZERO SECOND IF

CROSS-REFERENCE TO RELATED APPLICATIONS/INCORPORATION BY REFERENCE

This application is related to the following applications, each of which is incorporated herein by reference in its entirety for all purposes:
U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976,575 filed Oct. 29, 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,005 filed Oct. 29; 2004;
U.S. patent application Ser. No. 10/977,771 filed Oct. 29, 2004;
U.S. patent application Ser. No. 10/977,868 filed Oct. 29, 2004;
U.S. patent application Ser. No. 10/976,666 filed Oct. 29, 2004;
U.S. patent application Ser. No. 10/977,631 filed Oct. 29, 2004;
U.S. patent application Ser. No. 10/977,210 filed Oct. 29, 2004;
U.S. patent application Ser. No. 10/977,872 filed Oct. 29, 2004;
U.S. patent application Ser. No. 10/977,869 filed Oct. 29, 2004;
U.S. patent application Ser. No. 10/977,874 filed Oct. 29. 2004; and
U.S. patent application Ser. No. 10/976,996 filed Oct. 29, 2004.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to the processing of radio signals in a radio frequency (RF) transceiver. More specifically, certain embodiments of the invention relate to a method and system for a dual mode receiver with low intermediate frequency (IF) and zero second IF.

BACKGROUND OF THE INVENTION

In conventional wireless communication systems, a signal comprising information of interest may be modulated for transmission by utilizing a radio frequency (RF) carrier signal. The selection of the carrier signal may depend on the physical characteristics of the transmission medium, the spectral band allocated for transmission, and/or the specifications of the transmitter and receiver devices. At a front end of a radio receiver, the RF signal may be downconverted from the carrier signal before further processing may be performed on the information transmitted. In some receiver front ends, the RF signal may be down converted to a low intermediate frequency (IF) in the receiver or it may further down converted to zero IF or DC frequency, generally known as baseband. The contents of the original signal may be processed either in analog or digital format. In other receiver front ends, the RF signal may be downconverted directly to the baseband frequency.

Today, much of the development and design of radio receivers, transmitters, and transceivers has been driven by the great demand for devices for mobile wireless communication applications, especially handset devices. With the ever decreasing size of mobile handsets and an ever increasing demand for voice, data, and/or video processing capabilities, there is an growing need to develop radio receivers and transmitters that not only meet these challenging performance requirements, but that do so in smaller integrated circuit (IC) footprints, that is, at lower cost, and with greater power efficiency. One approach that aims at addressing these demands is the development of highly integrated radio transceivers in complementary metal oxide semiconductor (CMOS) technology to minimize the number of off-chip components.

However, the various components that may be utilized in highly integrated radio transceivers may come from different vendors and/or may have different interface requirements. For example, some highly integrated designs may utilize baseband processors capable of receiving and processing information which has been downconverted to baseband frequency at a receiver's front end. In this regard, the receiver front end may be easily integrated with such a baseband processor. In other instances, however, a baseband processor may have an interface that requires receiving signal which have been downconverted to a low IF at the receiver's front end. In this case a receiver front end that provides baseband frequency signals may not be easily integrated with the baseband processor. Addressing compatibility issues among various components of highly integrated transceivers is important in providing the cost and efficiency benefits that current mobile wireless communication applications demand.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a dual mode receiver with low intermediate frequency (IF) and zero second IF. Aspects of the method may comprise generating a control signal for initiation of a down conversion mode of operation in a radio frequency (RF) receiver. The generated control signal may be a differential signal. A selection of the down conversion mode of operation may be received by the RF receiver. The down conversion mode of operation may be selected from a low intermediate frequency (IF) down conversion mode or a baseband frequency down conversion mode. A frequency mixer in the RF receiver may be configured based on the generated control signal. The frequency mixer may be configured in an "I" signal component path in the RF receiver and/or in a "Q"

signal component path in the RF receiver. A modulated signal may be down converted by utilizing the configured frequency mixer.

When the selected down conversion mode of operation is the low intermediate frequency (IF) down conversion mode, the control signal generated to configure the frequency mixer may comprise a HIGH signal and a LOW signal. Moreover, the down-converted modulated signal may be transferred to an intermediate frequency (IF) interface when the down conversion mode of operation is the low IF down conversion mode.

When the selected down conversion mode of operation is the baseband down conversion mode, the control signal generated to configure the frequency mixer may be based on a local oscillator signal. The local oscillator signal may be based on a low intermediate frequency (IF). The local oscillator signal may also be a square wave. Moreover, the down-converted modulated signal may be transferred to a baseband processor when the down conversion mode of operation is the baseband down conversion mode.

In another embodiment of the invention, a machine-readable storage may be provided having stored thereon, a computer program having at least one code for signal processing in wireless receivers, the at least one code section being executable by a machine for causing the machine to perform steps in the method described for a dual mode receiver with low intermediate frequency (IF) and zero second IF.

Aspects of the system may comprise circuitry that generates a control signal for initiation of a down conversion mode of operation in a radio frequency (RF) receiver. The generated control signal may be a differential signal. Circuitry may be provided for receiving a selection for the initiation of the down conversion mode of operation. At least one processor may select the down conversion mode of operation from a low intermediate frequency (IF) down conversion mode or a baseband frequency down conversion mode. The system may also comprise a frequency mixer for down converting a modulated signal.

The circuitry that generates the control signal may be adapted to generate the control signal for configuring the frequency mixer to comprise a HIGH signal and a LOW signal when the selected down conversion mode of operation is the low intermediate frequency (IF) down conversion mode. The circuitry may also be adapted to generate the control signal for configuring the frequency mixer to be based on a local oscillator signal when the selected down conversion mode of operation is the baseband down conversion mode. The local oscillator signal may be based on a low intermediate frequency (IF). The local oscillator signal may be a square wave. Circuitry may also be provided for configuring a frequency mixer in the RF receiver based on the generated control signal. Circuitry may be provided for configuring the frequency mixer in an "I" signal component path in the RF receiver and/or in an "Q" signal component path in the RF receiver.

Circuitry may be provided for transferring said down-converted modulated signal to a baseband processor when said down conversion mode of operation is a baseband down conversion mode. Circuitry may also be provided for transferring the down-converted modulated signal to an intermediate frequency (IF) interface when the down conversion mode of operation is a low IF down conversion mode.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a dual mode receiver with low intermediate frequency (IF) and zero second IF. By utilizing a receiver front end (RFE) that may provide either a low IF or a zero IF, a single receiver front end may be utilized with a plurality of baseband processors and/or interface devices. This dual mode approach provides a cost effective solution for the implementation of highly integrated radio frequency (RF) transceivers.

Figure 1A:
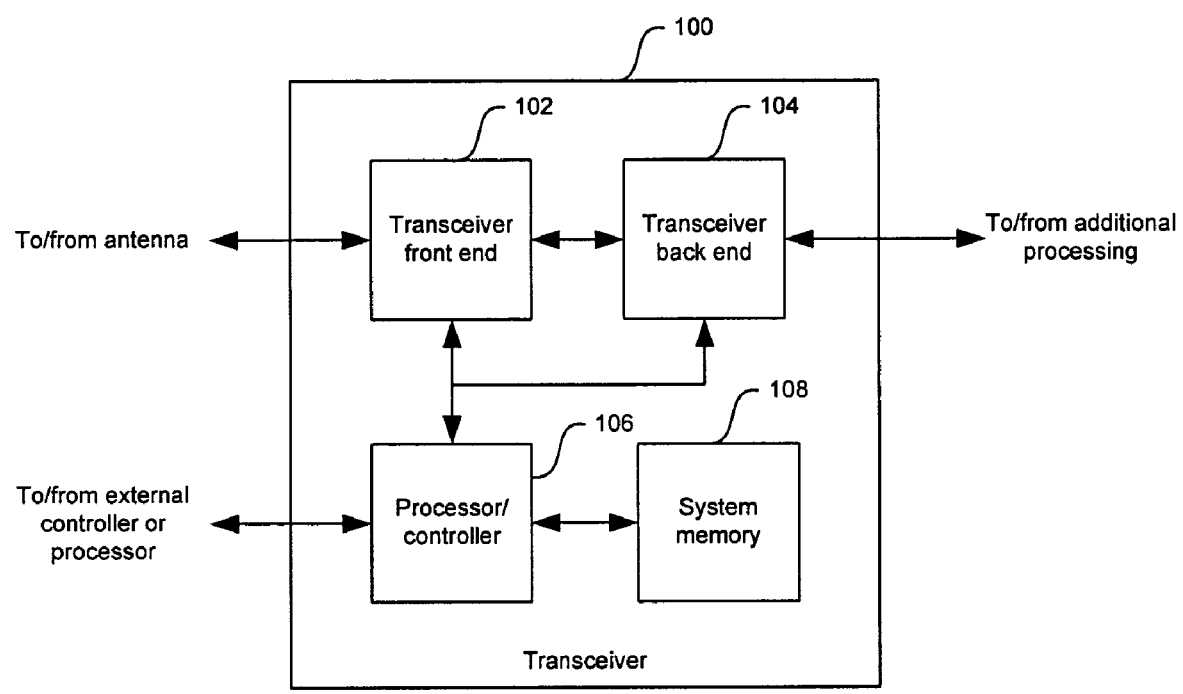
FIG. 1A is a block diagram of an exemplary radio frequency RF transceiver system, in accordance with an embodiment of the invention.

FIG. 1A is a block diagram of an exemplary RF transceiver system, in accordance with an embodiment of the invention. Referring to FIG. 1A, the RF transceiver system 100 may comprise a transceiver front end 102, a transceiver back end 104, a controller/processor 106, and a system memory 108. The transceiver front end 102 may comprise suitable logic, circuitry, and/or code that may be adapted to receive and/or transmit an RF signal. The transceiver front end 102 may comprise a receiver portion and a transmitter portion. Both the transmitter portion and the receiver portion may be coupled to an external antenna for signal broadcasting and signal reception respectively. The transceiver front end 102 may modulate a signal for transmission and may also demodulate a received signal before further processing of the received signal is to occur. Moreover, the transceiver front end 102 may provide other functions, for example, digital-to-analog conversion, analog-to-digital conversion, frequency downsampling, frequency upsampling, and/or filtering. The transceiver front end 102 may provide a local oscillator frequency which may be utilized for modulation and/or demodulation operations.

The transceiver back end 104 may comprise suitable logic, circuitry, and/or code that may be adapted to digitally process received signals from the transceiver front end 102 and/or to process signals received from at least one processing block, which may be located external to the RF transceiver system 100. The transceiver back end 104 may comprise, for example, a baseband processor. In this case, signals transferred from the transceiver front end 102 to the transceiver back end 104 may have been downconverted to a baseband frequency. The transceiver back end 104 may also comprise a signal interface that allows the transceiver front end 102 to transfer signals that have been downconverted to a low IF. In this case, a baseband processor in the transceiver back end 104 may process information after downconversion to the baseband frequency by the signal interface.

The controller/processor 106 may comprise suitable logic, circuitry, and/or code that may be adapted to control the operations of the transceiver front end 102 and/or the transceiver back end 104. For example, the controller/processor 106 may be utilized to update and/or modify programmable parameters and/or values in a plurality of components, devices, and/or processing elements in the transceiver front end 102 and/or in the transceiver back end 104. Control and/or data information may be transferred from at least one controller and/or processor external to the RF transceiver system 100 to the controller/processor 106 during the operation of the RF transceiver system 100. Moreover, the controller/processor 106 may also be adapted to transfer control and/or data information to at least one controller and/or processor external to the RF transceiver system 100.

The controller/processor 106 may be adapted to utilize the received control and/or data information to determine the mode of operation of the transceiver front end 102. For example, the controller/processor 106 may be adapted to select between a mode of operation where a received signal in the transceiver front end 102 may be down converted to a baseband frequency or a mode of operation where a received signal may be downconverted to a low IF. The system memory 108 may comprise suitable logic, circuitry, and/or code that may be adapted to store a plurality of control and/or data information.

Figure 1B:
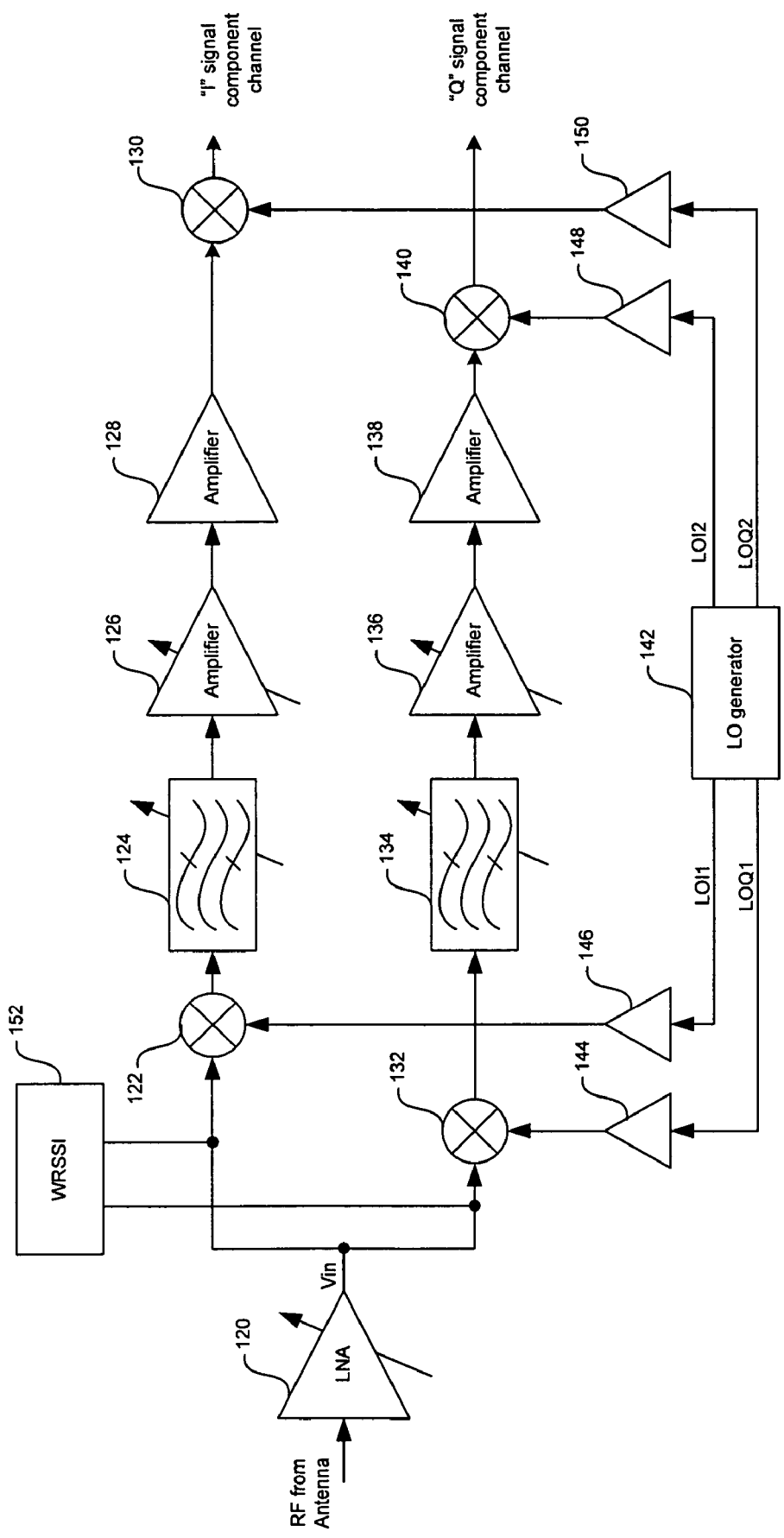
FIG. 1B is a block diagram of a receiver portion of a RF transceiver front end with dual mode mixers, in accordance with an embodiment of the invention.

FIG. 1B is a block diagram of a receiver portion of a RF transceiver front end with dual mode mixers, in accordance with an embodiment of the invention. Referring to FIG. 1B, there is shown a low noise amplifier (LNA) 120, mixers 122 and 132, bandpass filters 124 and 134, programmable gain amplifiers (PGA) 126 and 136, amplifiers 128 and 138, mixer blocks 130 and 140, a wideband receiver signal strength indicator (WRSSI) 152, buffers 144, 146, 148, and 150, and local oscillator (LO) generator 142. The LNA 120 may comprise suitable logic, circuitry, and/or code that may be adapted to amplify input signals and output the amplified signals. The LNA 120 may be utilized in instances where the signal to noise ratio (SNR) may be relatively low, such as, for example, RF signals received by an antenna. Certain aspects of the LNA 120 may be controllable and may be controlled by, for example, the processor/controller 106 in FIG. 1A. For example, the LNA 120 may be adapted to have a controllable gain. The WRSSI 152 may comprise suitable logic, circuitry, and/or code that may be adapted to determine the strength of the received signal. The WRSSI 152 may be adapted to generate a feedback control signal to the LNA 120 to modify the gain setting, for example.

The mixers 122 and 132 may comprise suitable logic, circuitry, and/or code that may be adapted to have as inputs two signals, and generate an output signal, which may be a difference of the frequencies of the two input signals and/or a sum of the frequencies of the two input signals. The mixers 122 and 132 may be adapted to down convert the received signal from an RF modulation frequency to an intermediate frequency (IF), for example. The mixers 122 and 132 may be adapted to utilize the local oscillator signals LOI1 and LOQ1, respectively. In this regard, the LOI1 and LOQ1 signals may comprise a plurality of signals.

The bandpass filters 124 and 134 may comprise suitable logic, circuitry, and/or code that may be adapted to selectively pass signals within a certain bandwidth while attenuating signals outside that bandwidth. The bandpass filters 124 and 134 may further comprise an amplifier circuit that may amplify the bandpass filtered signal, and the gain of the amplifier circuit may be controlled by, for example, the transceiver back end 104 or the processor/controller 106 in FIG. 1A.

The PGAs 126 and 136 may comprise suitable logic, circuitry, and/or code that may be adapted to amplify input signals and output the amplified signals. Certain aspects of the PGAs 126 and 136 may be controllable. The gain of the PGAs 126 and 136 may be controllable and may be controlled by, for example, the transceiver back end 104 or the processor/controller 106 in FIG. 1A. The gain of the PGAs 126 and 136 may be as high as, for example, 30 dB. The amplifiers 128 and 138 may comprise suitable logic, circuitry, and/or code that may be adapted to amplify input signals and output the amplified signals. The amplifiers 128 and 138 may be fixed gain amplifiers, and the gain may be fixed, for example, at 15 dB.

The mixer blocks 130 and 140 may comprise suitable logic, circuitry, and/or code that may be adapted to mix an input signal with a local oscillator input signal to produce an output signal that may be a difference of the frequencies of the two input signals and/or a sum of the frequencies of the two input signals. The mixer blocks 130 and 140 may be adapted to select between a low intermediate frequency (IF) mode or a baseband frequency mode. In this regard, the mixer blocks 130 and 140 may be said to be dual mode mixer blocks, for example. When the low intermediate frequency (IF) mode is selected, the mixer blocks 130 and 140 may pass through the input signal without performing a down conversion. When the baseband frequency mode is selected, the mixer blocks 130 and 140 may down convert the input signal to zero frequency or baseband at the output. Moreover, the mixer blocks 130 and 140 may reduce noise around a desired bandwidth of the output signal by utilizing phase shifted input signals and phase shifted local oscillator signals.

The local oscillator (LO) generator 142 may comprise suitable logic, circuitry, and/or code that may be adapted to generate local oscillator signals that may be utilized by the mixers 122 and 132 and the mixer blocks 130 and 140. In this regard, the LO generator 142 may generate a plurality of signals. While the LO generator 142 in FIG. 1B is shown to generate the signals LOI1, LOI2, LOQ1, and LOQ2, it may not be so limited. The LO generator 142 may generate local oscillator signals LOI1 and LOQ1 of a plurality of frequencies and/or at different phase values relative to each other. The LO generator 142 may generate local oscillator signals LOI2 and LOQ2 of a plurality of frequencies and/or at different or same phase values relative to each other. In this regard, the operation and output signals generated by the LO generator 142 may be controllable and may be controlled by, for example, the transceiver back end 104 or the processor/controller 106 in FIG. 1A. The buffers 144, 146, 148, and 150 may comprise suitable logic, circuitry, and/or code that may be adapted to buffer the local oscillator signals before being communicated or transferred to the corresponding frequency mixers.

In operation, the RF signal, which may have a carrier frequency referred to as $\omega_0$, may be received by an antenna and communicated to the LNA 120, where the RF signal may be amplified by the LNA 120. The amplified RF signal may be communicated to an input of the mixers 122 and 132. The mixers 122 and 132 may mix this amplified signal with local oscillator signals LOI1 and LOQ1, respectively. The outputs of the mixers 122 and 132 may be intermediate frequency (IF)

"I" and "Q" signal components, respectively. The intermediate frequency may be, for example, 100 KHz.

The IF "I" and "Q" signal components may be communicated to bandpass filters 124 and 134, which may be adapted to pass the desired bandwidth of signals about the IF frequency, while attenuating the undesired frequencies in the IF signal, and may also amplify the desired bandwidth of signals. The filtered and amplified IF "I" and "Q" signal components may be communicated to PGAs 126 and 136, and these signals may be amplified. The current gain of the PGAs 126 and 136 may be controlled by, for example, the transceiver back end 104 or the processor/controller 106 in FIG. 1A. The amplified output signals IF "I" and IF "Q" from the PGAs 126 and 136 may be communicated to the amplifiers 128 and 138. At the amplifiers 128 and 138, IF "I" and "Q" signal components may be further amplified. The IF "I" signal component at the output of the amplifier 128 may be communicated to at least the input of the mixer block 130 and the IF "Q" signal component at the output of the amplifier 138 may be communicated to at least the input of the mixer block 140.

The mixer blocks 130 and 140 may be configured to either pass through the IF "I" and "Q" signal components at the low IF or may be configured to down convert the IF "I" and "Q" signal components to "I" and "Q" baseband signals respectively. The local oscillator signals LOI2 and LOQ2 may be utilized as control signals to configure the operation of the mixer blocks 130 and 140. When the IF "I" and "Q" signal components are passed through, they may be transferred to a circuit, device, and/or component that comprises an IF interface. When the "I" and "Q" baseband signals are generated by down conversion at the mixer blocks 130 and 140, they may be transferred to a circuit, device, and/or component that comprises a baseband interface.

Figure 1C:
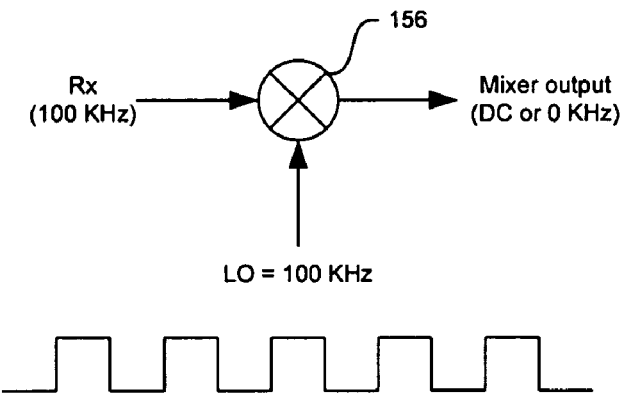
FIG. 1C illustrates an exemplary baseband down conversion operation in a dual mode mixer, in accordance with an embodiment of the invention.

FIG. 1C illustrates an exemplary baseband down conversion operation in a dual mode mixer, in accordance with an embodiment of the invention. Referring to FIG. 1C, when the mode of operation selected is a baseband down conversion mode, a dual mode mixer block 156 may be utilized in a baseband down conversion configuration. The dual mode mixer block 156 may comprise suitable logic, circuitry, and/or code that may be adapted to generate a mixer output signal at baseband from an IF input signal and a IF local oscillator signal when the baseband down conversion mode is selected. In this case, the intermediate frequency may be 100 KHz, for example, and the baseband frequency refers to 0 KHz or DC frequency. The local oscillator frequency may be a differential signal and/or may be a square wave.

Figure 1D:
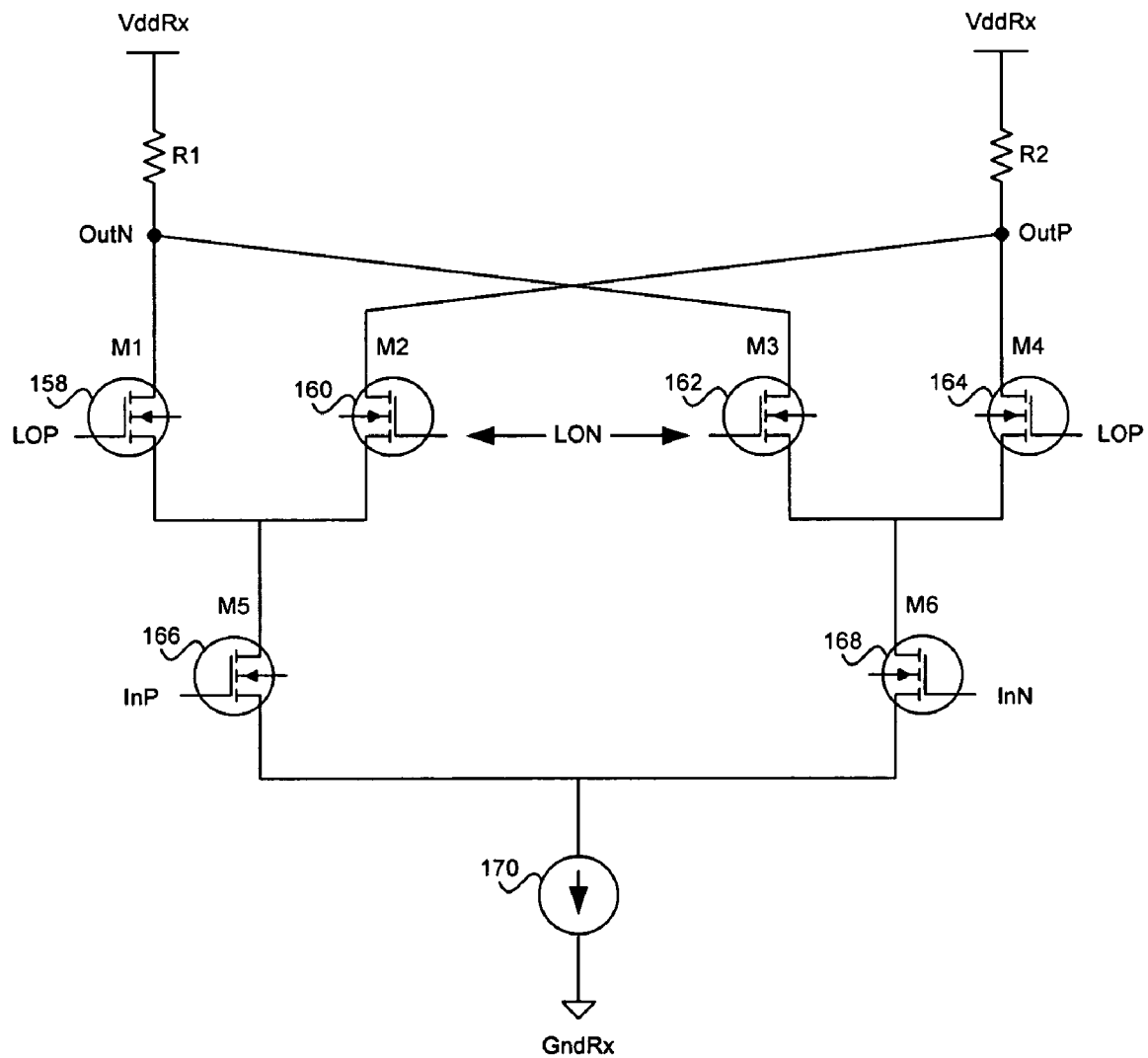
FIG. 1D is a circuit diagram of an exemplary dual mode mixer in baseband down conversion configuration, in accordance with an embodiment of the invention.

FIG. 1D is a circuit diagram of an exemplary dual mode mixer in baseband down conversion configuration, in accordance with an embodiment of the invention. Referring to FIG. 1D, the dual mode mixer block 156 in FIG. 1D may be implemented utilizing the exemplary circuit shown. The dual mode mixer block 156 may comprise a first NMOS transistor (M1) 158, a second NMOS transistor (M2) 160, a third NMOS transistor (M3) 162, a fourth NMOS transistor (M4) 164, a fifth NMOS transistor (M5) 166, a sixth NMOS transistor (M6) 168, resistors R1 and R2, and a current source 170. The implementation described in FIG. 1E may be referred to as a Gilbert cell.

Transistors M1 158, M2 160, M3 162, and M4 164 may be utilized to perform the frequency mixing operation in the dual mode mixer block 156. Transistors M5 166 and M6 168 may be utilized to provide a differential input gain based on the value of the current source 170. Resistors R1 and R2 may be utilized to provide load between the drains of the frequency mixing transistors and the supply voltage (VddRx).

In operation, when the mode of operation is the baseband down conversion mode, a positive signal of the local oscillator differential pair (LOP) may be applied to the gate of M1 158 and to the gate of M4 164, while a negative signal of the local oscillator differential pair (LON) may be applied to the gate of M2 160 and to the gate of M3 162. The positive signal of the IF signal component differential pair may be applied to the gate of M5 166 and the negative signal of the IF signal component differential pair may be applied to the gate of M6 168. In this configuration, the differential output generated at the nodes OutN and OutP may be a baseband frequency signal produced from the modulated IF differential pair and the IF local oscillator differential pair.

Figure 1E:
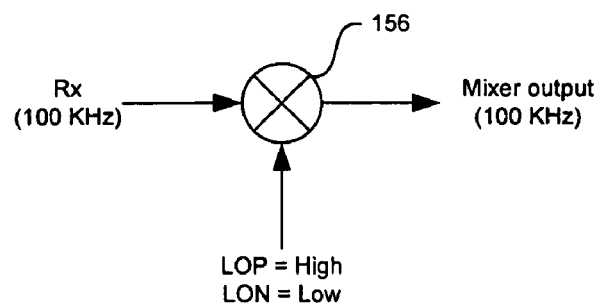
FIG. 1E illustrates an exemplary low intermediate frequency (IF) down conversion operation in a dual mode mixer, in accordance with an embodiment of the invention.

While the dual mode mixer block 156 as described in FIG. 1E comprises NMOS transistors and is implemented utilizing a single gain stage and a single mixing stage, the dual mode mixer block 156 may also be designed utilizing PMOS and/or CMOS devices and may also be implemented utilizing a plurality of gain and/or mixing stages.

FIG. 1E illustrates an exemplary low intermediate frequency (IF) down conversion operation in a dual mode mixer, in accordance with an embodiment of the invention. Referring to FIG. 1E, when the mode of operation selected is an IF down conversion mode, a dual mode mixer block 156 may be utilized in an IF down conversion configuration. The dual mode mixer block 156 may comprise suitable logic, circuitry, and/or code that may be adapted to generate a mixer output signal at the IF from an IF input signal and a local oscillator signal when the IF down conversion mode is selected. The intermediate frequency may be 100 KHz, for example. In this case, the dual mode mixer block 156 may be said to operate in a pass through mode.

Figure 1F:
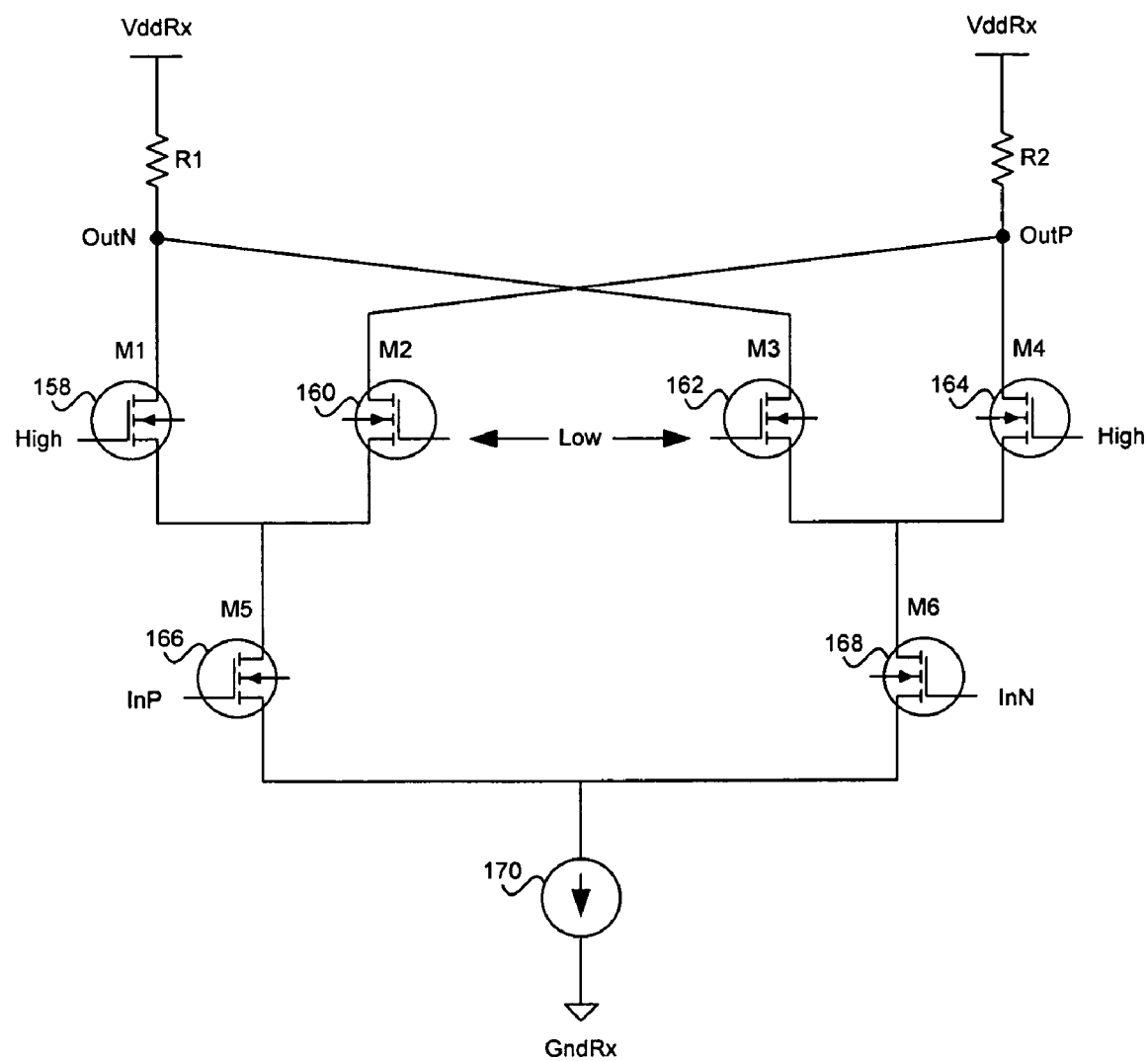
FIG. 1F is a circuit diagram of an exemplary dual mode mixer in low intermediate frequency IF down conversion configuration, in accordance with an embodiment of the invention.

FIG. 1F is a circuit diagram of an exemplary dual mode mixer in low intermediate frequency IF down conversion configuration, in accordance with an embodiment of the invention. Referring to FIG. 1F, the positive signal of the local oscillator differential pair (LOP) applied to the dual mode mixer block 156 is HIGH and the negative signal of the local oscillator differential pair (LON) applied to the dual mode mixer block 156. In this configuration, transistors M2 160 and M3 162 are OFF and transistors M1 158 and M4 164 are ON and the dual mode mixer block 156 may operate as a differential amplifier. In this case, the differential output OutP/OutN of the dual mode mixer block 156 may be of the same frequency as the differential input signal InP/InN. Moreover, the output of the dual mode mixer block 156 may have a gain relative to the input signal, where the gain may be based on the gain provided by the differential amplifier.

Figure 2:
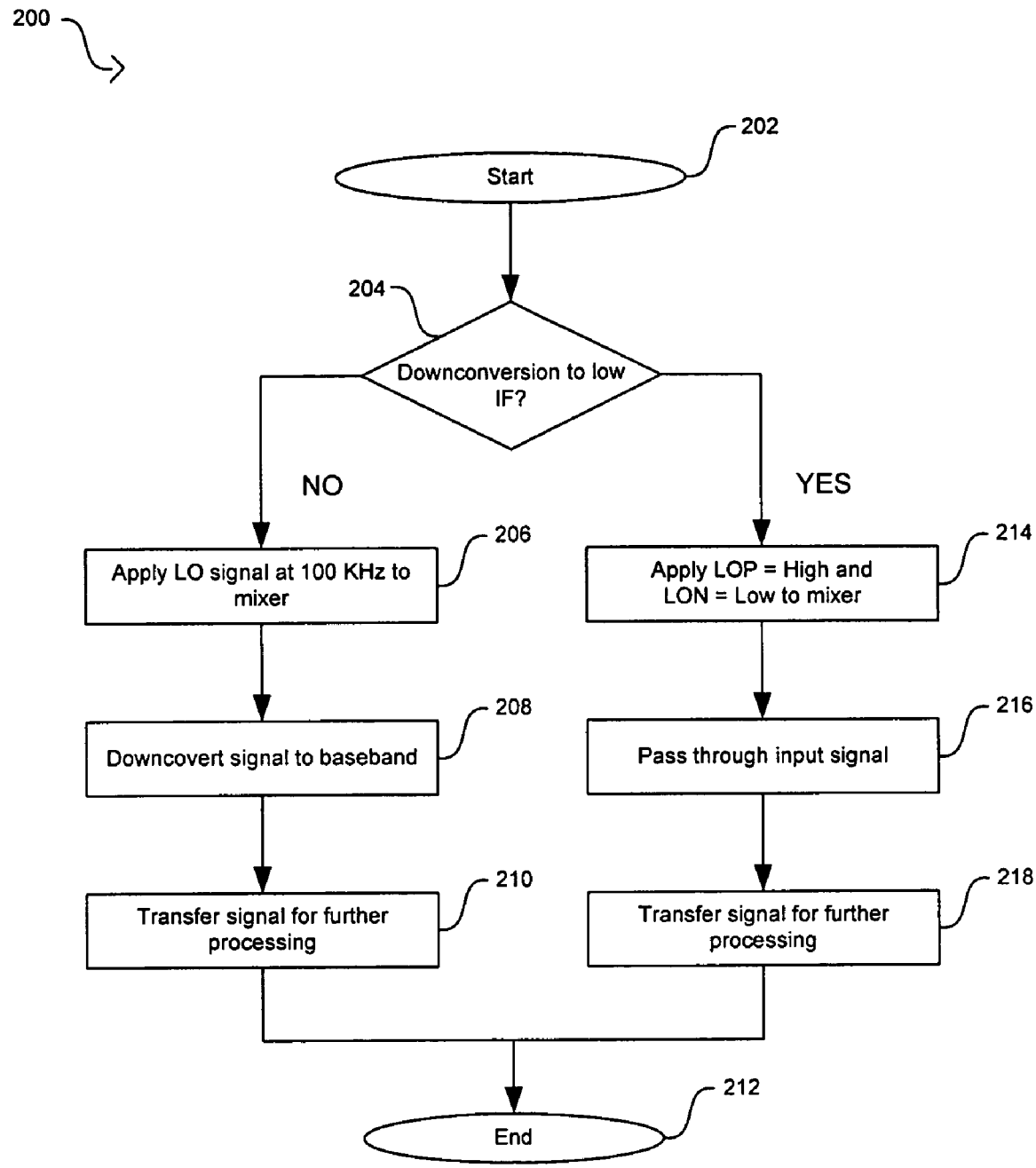
FIG. 2 is a flow diagram that illustrates exemplary steps that may be utilized in the operation of a dual mode receiver, in accordance with an embodiment of the invention.

FIG. 2 is a flow diagram that illustrates exemplary steps that may be utilized in the operation of a dual mode receiver, in accordance with an embodiment of the invention. Referring to FIG. 2, after start step 202, the receiver portion of the RF transceiver front end 102 in FIG. 1A may be configured for integration with a next device by determining in step 204 whether the down conversion is to the low intermediate frequency (IF). When the down conversion is to the baseband frequency, the flow diagram 200 may proceed to step 206 where the local oscillator differential signal at the IF may be generated and applied to the dual mode mixer blocks 130 and 140 in FIG. 1B. In step 208, the dual mode mixer blocks 130 and 140 may downconvert the input signals to the baseband frequency utilizing the local oscillator differential signal. In step 210, the baseband differential signal OutP/OutN may be transferred to a device, circuit, and/or component that comprises a baseband interface for further processing. After step 210, the flow diagram 200 may proceed to end step 212.

When the down conversion is to the low IF, that is, the dual mode mixer blocks 130 and 140 are operating in the pass through mode, the flow diagram 200 may proceed to step 214 where the local oscillator differential signal may be generated and applied to the dual mode mixer blocks 130 and 140. In this regard, LOP is HIGH and LON is LOW. In step 216, the dual mode mixer blocks 130 and 140 may pass through the input signals based on the configuration provided by the local oscillator differential signal. In step 218, the IF differential signal OutP/OutN may be transferred to a device, circuit, and/or component that comprises an IF interface for further processing. After step 218, the flow diagram 200 may proceed to end step 212.

By utilizing the approach described above, a receiver front end (RFE) may perform either a low IF or a zero IF down conversion and may be utilized with a plurality of baseband processors and/or interface devices. This dual mode approach provides a cost effective solution for the implementation of highly integrated radio frequency (RF) transceivers.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in wireless receivers, the method comprising:
   generating a control signal that enables a dual mode mixer within a RF receiver to operate in one of a plurality of modes, wherein said control signal enables signal pass through operation or signal down conversion of a modulated input signal;
   configuring said dual mode mixer to enable said signal pass through operation or said frequency down conversion based on said generated control signal, wherein for said signal pass through operation said dual mode mixer outputs a signal that has a same frequency as said modulated input signal; and
   passing through or down converting said modulated input signal based on said configuration of said dual mode mixer.

2. The method according to claim 1, comprising selecting one of said plurality of modes of operation.

3. The method according to claim 1, comprising selecting said one of said plurality of modes of operation from said signal pass through operation mode or said signal down conversion.

4. The method according to claim 1, wherein said generated control signal is a differential signal.

5. The method according to claim 1, comprising generating said control signal for configuring said dual mode mixer to comprise a HIGH signal and a LOW signal when said one of said plurality of modes of operation is said signal pass through operation.

6. The method according to claim 1, comprising generating said control signal for configuring said dual mode mixer based on a local oscillator signal when said one of said plurality of modes of operation is said signal down conversion.

7. The method according to claim 6, wherein said local oscillator signal is based on a low intermediate frequency (IF) signal.

8. The method according to claim 6, wherein said local oscillator signal is a square wave signal.

9. The method according to claim 1, comprising configuring said dual mode mixer in an "I" signal component path in said RF receiver.

10. The method according to claim 1, comprising configuring said dual mode mixer in a "Q" signal component path in said RF receiver.

11. The method according to claim 1, comprising transferring said down-converted modulated signal to a baseband processor when said one of said plurality of modes of operation is said signal down conversion.

12. The method according to claim 1, comprising transferring said down-converted modulated signal to an intermediate frequency (IF) interface when said one of said plurality of modes of operation is a low IF down conversion mode.

13. A machine-readable storage having stored thereon, a computer program having at least one code for processing signals in wireless receivers, the at least one code section being executable by a machine for causing the machine to perform steps comprising:
   generating a control signal that enables a dual mode mixer in a RF receiver to operate in one of a plurality of modes, wherein said control signal enables signal pass through operation or signal down conversion;
   configuring said dual mode mixer to enable said signal pass through operation or said frequency down conversion of a modulated input signal based on said generated control signal, wherein for said signal pass through operation said dual mode mixer outputs a signal that has a same frequency as said modulated input signal; and
   passing through or down converting said modulated input signal based on said configuration of said dual mode mixer.

14. The machine-readable storage according to claim 13, wherein said at least one code section comprises code for selecting one of said plurality of modes of operation.

15. The machine-readable storage according to claim 13, wherein said at least one code section comprises code for selecting said one of said plurality of modes of operation from said signal pass through operation mode or said signal down conversion.

16. The machine-readable storage according to claim 13, wherein said generated control signal is a differential signal.

17. The machine-readable storage according to claim 13, wherein said at least one code section comprises code for generating said control signal for configuring said dual mode mixer to comprise a HIGH signal and a LOW signal when said one of said plurality of modes of operation is said signal pass through operation mode.

18. The machine-readable storage according to claim 13, wherein said at least one code section comprises code for generating said control signal for configuring said dual mode mixer based on a local oscillator signal when said one of said plurality of modes of operation is said signal down conversion.

19. The machine-readable storage according to claim 18, wherein said local oscillator signal is based on a low intermediate frequency (IF) signal.

20. The machine-readable storage according to claim 18, wherein said local oscillator signal is a square wave signal.

21. The machine-readable storage according to claim 13, wherein said at least one code section comprises code for configuring said dual mode mixer in an "I" signal component path in said RF receiver.

22. The machine-readable storage according to claim 13, wherein said at least one code section comprises code for configuring said dual mode mixer in a "Q" signal component path in said RF receiver.

23. The machine-readable storage according to claim 13, wherein said at least one code section comprises code for transferring said down-converted modulated signal to a baseband processor when said one of said plurality of modes of operation is said signal down conversion.

24. The machine-readable storage according to claim 13, wherein said at least one code section comprises code for transferring said down-converted modulated signal to an intermediate frequency (IF) interface when said one of said plurality of modes of operation is said signal pass through operation mode.

25. A system for signal processing in wireless receivers, the system comprising:
one or more circuits, within a RF receiver, said one or more circuits comprising a dual mode mixer, wherein said one or more circuits enable generation of a control signal that enables said dual mode mixer to operate in one of a plurality of modes, and said control signal enables signal pass through operation or signal down conversion of a modulated input signal;
said one or more circuits enable configuration of said dual mode mixer to enable said signal pass through operation or said frequency down conversion based on said generated control signal, wherein for said signal pass through operation said dual mode mixer outputs a signal that has a same frequency as said modulated input signal; and
said dual mode mixer enables passing through or down converting of said modulated input signal based on said configuration of said dual mode mixer.

26. The system according to claim 25, wherein said one or more circuits comprise at least one processor that enables selection of said one of said plurality of modes of operation.

27. The system according to claim 25, wherein said one or more circuits comprise at least one processor that enables selection of said one of said plurality of modes of operation from said signal pass through operation mode or said signal down conversion.

28. The system according to claim 25, wherein said generated control signal is a differential signal.

29. The system according to claim 25, wherein said one or more circuits enable generation of said control signal for configuring said RF receiver to comprise a HIGH signal and a LOW signal when said one of said plurality of modes of operation is said signal pass through operation mode.

30. The system according to claim 25, wherein said one or more circuits enable generation of said control signal for configuring said RF receiver based on a local oscillator signal when said one of said plurality of modes of operation is said signal down conversion.

31. The system according to claim 30, wherein said local oscillator signal is based on a low intermediate frequency (IF) signal.

32. The system according to claim 30, wherein said local oscillator signal is a square wave signal.

33. The system according to claim 25, wherein said one or more circuits enable configuration of said dual mode mixer in an "I" signal component path in said RF receiver.

34. The system according to claim 25, wherein said one or more circuits enable configuration of said dual mode mixer in a "Q" signal component path in said RF receiver.

35. The system according to claim 25, wherein said one or more circuits enable transferring said down-converted modulated signal to a baseband processor when said one of said plurality of modes of operation is said signal down conversion.

36. The system according to claim 25, wherein said one or more circuits enable transferring said down-converted modulated signal to an intermediate frequency (IF) interface when said one of said plurality of modes of operation is said signal pass through operation mode.

* * * * *

UNITED STATES PATENT AND TRADEMARK OFFICE
CERTIFICATE OF CORRECTION

PATENT NO. : 7,606,550 B2 Page 1 of 1
APPLICATION NO. : 10/976639
DATED : October 20, 2009
INVENTOR(S) : Pan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this

Twelfth Day of October, 2010

David J. Kappos
*Director of the United States Patent and Trademark Office*